US011639401B2

(12) United States Patent
Locco et al.

(10) Patent No.: US 11,639,401 B2
(45) Date of Patent: May 2, 2023

(54) AQUEOUS COATING COMPOSITION NEUTRALIZED WITH AMINO ALCOHOLS

(71) Applicants: Rohm and Haas Company, Collegeville, PA (US); Dow Global Technologies LLC, Midland, MI (US)

(72) Inventors: Michael Locco, Warminster, PA (US); Asghar A. Peera, Royersford, PA (US); Michael Schimmel, Langhorne, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 436 days.

(21) Appl. No.: 16/336,479

(22) PCT Filed: Oct. 3, 2017

(86) PCT No.: PCT/US2017/054826
§ 371 (c)(1),
(2) Date: Mar. 26, 2019

(87) PCT Pub. No.: WO2018/067491
PCT Pub. Date: Apr. 12, 2018

(65) Prior Publication Data
US 2021/0284765 A1   Sep. 16, 2021

Related U.S. Application Data

(60) Provisional application No. 62/404,388, filed on Oct. 5, 2016.

(51) Int. Cl.
| | | |
|---|---|---|
| *C09D 133/02* | (2006.01) |
| *C09D 133/08* | (2006.01) |
| *C09D 133/12* | (2006.01) |
| *C08F 20/14* | (2006.01) |
| *C08F 20/06* | (2006.01) |
| *C08L 33/02* | (2006.01) |
| *C08L 33/12* | (2006.01) |
| *C08F 220/06* | (2006.01) |
| *C08L 33/08* | (2006.01) |
| *C08F 220/14* | (2006.01) |

(52) U.S. Cl.
CPC .............. *C08F 20/14* (2013.01); *C08F 20/06* (2013.01); *C09D 133/12* (2013.01); *C08F 220/06* (2013.01); *C08F 220/14* (2013.01); *C08L 33/02* (2013.01); *C08L 33/08* (2013.01); *C08L 33/12* (2013.01); *C09D 133/02* (2013.01)

(58) Field of Classification Search
None
See application file for complete search history.

(56) References Cited

U.S. PATENT DOCUMENTS

| | | | |
|---|---|---|---|
| 5,869,581 A | 2/1999 | Tysak | |
| 5,965,116 A | 10/1999 | Mondet et al. | |
| 6,319,977 B1 | 11/2001 | Tysak | |
| 7,452,935 B2 | 11/2008 | Slone et al. | |
| 2008/0299405 A1* | 12/2008 | Wang | C09D 133/02 428/500 |
| 2014/0275460 A1* | 9/2014 | Tamareselvy | C08F 220/18 526/264 |

FOREIGN PATENT DOCUMENTS

| | | | |
|---|---|---|---|
| CN | 102585072 A | * | 7/2012 |
| CN | 102585072 A | | 7/2012 |
| CN | 105969021 A | | 9/2016 |
| EP | 1067115 A1 | | 1/2001 |
| EP | 1253173 A2 | | 10/2002 |
| JP | S59184241 A | | 10/1984 |
| JP | S61264076 A | | 11/1986 |
| JP | S6348315 A | | 3/1988 |
| JP | H08283613 A | | 10/1996 |
| JP | 2010163580 A | | 7/2010 |

* cited by examiner

*Primary Examiner* — Richard A Huhn
(74) *Attorney, Agent, or Firm* — Kenneth Crimaldi; Cantor Colburn LLP

(57) ABSTRACT

An acrylic polymer comprising from 3 to 17 wt % polymerized units of carboxylic acid monomer. The polymer is at least partially neutralized with an amino alcohol having a primary amino group.

2 Claims, No Drawings

AQUEOUS COATING COMPOSITION NEUTRALIZED WITH AMINO ALCOHOLS

This invention relates to an aqueous coating composition particularly useful as a floor finish.

In some cases, aqueous coating compositions used on floors and other surfaces comprise a two-component polyurethane system. For example, U.S. Pat. No. 7,452,935 discloses a system comprising a polyhydroxypolyacrylate resin which is neutralized with a tertiary amine containing hydroxyl groups. However, this reference does not disclose a floor finish which is removable, nor does it disclose the neutralized polymer of the present invention.

The problem addressed by the present invention is to provide an improved coating composition which is removable.

STATEMENT OF INVENTION

The present invention provides an acrylic polymer comprising from 3 to 17 wt % polymerized units of carboxylic acid monomer; said polymer at least partially neutralized with an amino alcohol having a primary amino group.

The present invention is further directed to a method for coating a substrate by applying to the substrate an aqueous coating composition comprising the acrylic polymer.

DETAILED DESCRIPTION

Percentages are weight percentages (wt %), temperatures are in ° C. and operations were performed at ambient temperature (typically 20-25° C.), unless specified otherwise. Weight percentages of monomer units or amino alcohols are based on the total weight of the dry polymer. Percentages listed with formulation ingredients are the percent solids of the aqueous emulsion or dispersion. All polymer Tg values were measured by differential scanning calorimetry (DSC), using a heating rate of 20° C. per minute with the Tg taken at the midpoint of the transition.

A "carboxylic acid monomer" is a monoethylenically unsaturated compound having at least one carboxylic acid group, preferably one or two, preferably one. Preferably, carboxylic acid monomers have from 3 to 8 carbon atoms, preferably 3 to 5, preferably 3 or 4.

As used herein the term "(meth)acrylic" refers to acrylic and/or methacrylic, and "(meth)acrylate" refers to acrylate and/or methacrylate. The term "(meth)acrylamide" refers to acrylamide (AM) and/or methacrylamide (MAM). "Acrylic monomers" include acrylic acid (AA), methacrylic acid (MAA), esters of AA and MAA, itaconic acid (IA), crotonic acid (CA), acrylamide (AM), methacrylamide (MAM), and derivatives of AM and MAM, e.g., alkyl (meth)acrylamides. Esters of AA and MAA include, but are not limited to, alkyl, benzyl, hydroxyalkyl, phosphoalkyl and sulfoalkyl esters, e.g., methyl methacrylate (MMA), ethyl methacrylate (EMA), butyl methacrylate (BMA), isobutyl methacrylate (iBMA), hydroxyethyl methacrylate (HEMA), hydroxyethyl acrylate (HEA), methyl acrylate (MA), ethyl acrylate (EA), butyl acrylate (BA), ethylhexyl acrylate (EHA) and phoshoethylmethacrylate (PAM). The term "vinyl monomers" refers to monomers that contain a carbon-carbon double bond that is connected to a heteroatom such as nitrogen or oxygen. Examples of vinyl monomers include, but are not limited to, vinyl acetate, vinyl formamide, vinyl acetamide, vinyl pyrrolidone, vinyl caprolactam, and long chain vinyl alkanoates such as vinyl neodecanoate, and vinyl stearate. The term "styrenic monomers" refers to styrene and vinyltoluene. An "acrylic polymer" comprises at least 50 wt % polymerized units of acrylic monomers, preferably at least 75 wt %, preferably at least 85 wt %, preferably at least 85 wt % polymerized units of monomers selected from (meth) acrylic acids and alkyl (meth)acrylates, more preferably at least 90 wt %, and most preferably at least 95 wt %. Preferably, any remaining monomer units are derived from vinyl monomers. Preferably, the acrylic polymer comprises no more than 10 wt % polymerized units of styrenic monomers, preferably no more than 5 wt %, preferably no more than 3 wt %, preferably no more than 2 wt %, preferably 0 wt %.

For purposes of this invention, alkyl groups are straight or branched chain alkyl groups. In some embodiments of the invention, the alkyl groups are of synthetic origin and may contain a range of chain lengths. Preferably, alkyl groups are straight or branched chain acyclic alkyl groups.

The acrylic polymer comprises an amino alcohol having primary amine functionality, i.e., at least one amino group, —$NH_2$; preferably no more than two, preferably one. Preferably, the amino alcohol has from 3 to 12 carbon atoms; preferably at least 4; preferably no more than 10, preferably no more than 8, preferably no more than 6. Preferably, the amino alcohol comprises from 1 to 5 hydroxyl groups, preferably 2 to 4, preferably 3. Preferably, the amino alcohol comprises at least one primary hydroxyl group, preferably at least two, preferably three. A preferred amino alcohol is 2-amino-2-hydroxymethyl-1,3-propanediol (CAS No. 77-86-1). Preferably, the acrylic polymer comprises from 1 to 10 wt % of the amino alcohol; preferably at least 1.5 wt %, preferably at least 2 wt %, preferably at least 2.5 wt %; preferably no more than 8 wt %, preferably no more than 6 wt %, preferably no more than 5 wt %. Preferably, the pH of the acrylic polymer is from 6 to 8.5, preferably 6.5 to 8, preferably 7 to 8. More than one amino alcohol may be present in the polymer.

Preferably, the polymer comprises no more than 2 wt % ammonia, preferably no more than 1 wt %, preferably no more than 0.5 wt %, preferably 0 wt %. Preferably, the polymer comprises no more than 2 wt % of tertiary amino alcohols, i.e., amino alcohols having a tertiary amino group, preferably no more than 1 wt %, preferably no more than 0.5 wt %, preferably 0 wt %. Preferably, the polymer comprises no more than 2 wt % of alkyl amines, preferably no more than 1 wt %, preferably no more than 0.5 wt %, preferably 0 wt %.

Preferably, the polymer further comprises monomer residues of $C_1$-$C_8$ alkyl (meth)acrylate(s). Preferably, the $C_1$-$C_8$ alkyl (meth)acrylate(s) comprise an alkyl methacrylate and an alkyl acrylate, preferably a $C_1$-$C_2$ alkyl methacrylate (MMA or EMA) and a $C_4$-$C_8$ alkyl acrylate (e.g., BA or EHA), preferably MMA and a $C_4$-$C_8$ alkyl acrylate, preferably MMA and BA. Preferably the total amount of polymerized $C_1$-$C_8$ alkyl (meth)acrylate monomer units is from 83 to 97 wt %. Preferably, the total amount of $C_1$-$C_8$ alkyl (meth)acrylate monomer units is at least 85 wt %, preferably at least 87 wt %, preferably at least 89 wt %; preferably no more than 95 wt %, preferably no greater than 93 wt %, preferably no greater than 91 wt %. Preferably, the polymer comprises from 15 to 40 wt % polymerized units of a $C_4$-$C_8$ alkyl acrylate; preferably at least 18 wt %, preferably at least 21 wt %, preferably at least 24 wt %; preferably no more than 37 wt %, preferably no more than 34 wt %, preferably no more than 32 wt %. Preferably, the polymer comprises from 45 to 80 wt % of a $C_1$-$C_2$ alkyl methacrylate; preferably at least 48 wt %, preferably at least 51 wt %, preferably at least 54 wt %, preferably at least 57 wt %; preferably no more than 77 wt %, preferably no more than 74 wt %, preferably no more than 71 wt %, preferably no more than 68 wt %.

Preferably, the polymer has a Tg of at least 30° C., preferably at least 40° C., preferably at least 50° C., preferably at least 60° C.; preferably no more than 80° C., preferably no more than 90° C., preferably no more than 95° C., preferably no more than 100° C. One skilled in the art would be able to select monomers in accordance with those described herein to arrive at any desired Tg value.

Preferably, the carboxylic acid monomer is (meth)acrylic acid, preferably methacrylic acid. Preferably, the polymer contains at least 5 wt % polymerized units of a carboxylic acid monomer, preferably at least 6 wt %, preferably at least 7 wt %, preferably at least 8 wt %; preferably no more than 15 wt %, preferably no more than 13 wt %, preferably no more than 12 wt %, preferably no more than 11 wt %.

Crosslinkers are monomers having two or more ethylenically unsaturated groups, and may include, e.g., divinylaromatic compounds, di-, tri- and tetra-(meth)acrylate esters, di-, tri- and tetra-allyl ether or ester compounds and allyl (meth)acrylate. Examples of such monomers include divinylbenzene (DVB), trimethylolpropane diallyl ether, tetraallyl pentaerythritol, triallyl pentaerythritol, diallyl pentaerythritol, diallyl phthalate, diallyl maleate, triallyl cyanurate, Bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA) and butylene glycol dimethacrylate (BGDMA). Preferably, the amount of polymerized crosslinker units in the polymer is no more than 1 wt %, preferably no more than 0.5 wt %, preferably no more than 0.2 wt %, preferably no more than 0.1 wt %, preferably no more than 0.05 wt %, preferably no more than 0.01 wt %.

Preferably, the polymer is dispersed in water as a uniform aqueous dispersion, i.e., a latex. Preferably, the aqueous dispersion comprises from 30 to 60 wt % of the polymer; preferably at least 35 wt %; preferably no more than 55 wt %, preferably no more than 50 wt %. More than one polymer according to this invention may be present, with the total amount of polymers being within the amounts specified above.

Preferably, an aqueous coating composition comprising the acrylic polymer has at least 45 wt % water; preferably at least 50 wt %, preferably at least 55 wt %, preferably at least 60 wt %, preferably at least 65 wt %; preferably no more than 80 wt %, preferably no more than 75 wt %. Preferably, the aqueous composition contains no more than 10 wt % organic solvent, preferably no more than 8 wt %, preferably no more than 6 wt %; preferably at least 2 wt %.

The average particle diameter of the emulsion polymer particles is typically from 40 nanometers to 1000 nanometers, preferably from 40 nanometers to 300 nanometers. Particle sizes herein were those measured by dynamic light scattering on a Brookhaven BI-90 analyzer. Latex samples were diluted to the appropriate concentration with 1N KCl (aq).

The floor coating composition of the present invention optionally may include other ingredients, e.g., waxes, alkali-soluble resins, plasticizers, wetting aids, defoamers, soluble or dispersed biocides, polyurethane dispersions, silicates, etc. Preferably, waxes are present in amounts from 0.5 to 10 wt %, preferably 1 to 7 wt % (amounts on a solids basis).

In the method of this invention, the aqueous composition is applied to a surface, e.g., floors, walls, counter tops, roofs, etc. Materials to which the composition may be applied include stone, concrete, asphalt, roofing substrates, linoleum, tile, wood, particle or fiber board, glass, leather, paper and cardboard. Preferably, the composition is applied to floors. Preferably, the composition is cured under ambient conditions without external heating, ventilation or humidity control, although these may be used as needed.

Evaluating the Performance of Floor Polish Coatings

In order to properly evaluate the performance of an emulsion polymer intended for use in a polish vehicle, it is necessary that the polymer be formulated as a polish. The formulation of the emulsion polymers of this invention are done in a manner common and well understood to those versed in this art. The ingredients used, and their proportions and manner of addition are the same as is commonly practiced with conventional technology emulsion polymers. The ingredients used in a formulated floor polish consists of emulsion polymer, wax emulsions, Alkali Soluble Resins (ASR), film formation aids, leveling agents, and wetting agents. The levels of coalescing solvents, plasticizing solvents and leveling agents used in a polish formulation is dictated by the compatibility of the emulsion polymer (overall composition of the polymer) with the selected solvents and additives and the minimum filming temperature of the emulsion polymer. For the emulsion polymer of the examples listed here, the coalescent, plasticizer and additive levels were as given in the formulation details, though minor adjustments were made as was appropriate to ensure that each of the polymer examples formed a glossy, apparently coherent film.

Test Methods:

Various tests were used to evaluate the performance of the emulsion polymer vehicle as a removable floor polish (or floor coating) in this invention. The method for applying the coating compositions is described in Annual Book of ASTM Standards, Section 15, Volume 15.04, test procedure ASTM D 3153, except that 0.04 mL. per square inch coating was applied to the substrates. A total of 2 coats were applied. The floor polish formulation was as follows:

Black Heel Mark and Scuff Resistance

The method for determining black heel and scuff resistance is described in Chemical Specialty Manufacturers Association Bulletin No. 9-73, except commercially available rubber shoe heels were used in place of the recommended 2" (5.1 cm) rubber cubes. We determined the percentage of the coated substrate area which was covered by black heel and scuff marks; this is conveniently performed with transparent graph paper. Black heel marks are an actual deposition of rubber onto or into the coating. A scuff mark, on the other hand, results from a physical displacement of the coating and appears as an area of reduced gloss. Scuff and black heel marks can occur simultaneously at the point where the heel impacts the substrate; i.e., upon removal of a black heel mark, a scuff may be present.

Gloss and Recoat Gloss

The method for determining the gloss performance and recoat gloss performance of polish formulations is described in Annual Book of ASTM Standards, Section 15, Volume 15.04, test procedure ASTM D 1455. Gloss determined on black vinyl composition tile.

Detergent Resistance

The method for determining detergent resistance is described in Annual Book of ASTM Standards, Section 15, Volume 15.04, test procedure ASTM D 3207, except $\frac{1}{20}$ dilution of GP Forward General Purpose Cleaner (Diversey Inc. Sturtevant, Wis. 53177 USA) in water was used as test detergent solution.

Removability

The method for determining polish removability is described in Annual Book of ASTM Standards, Section 15, Volume 15.04, test procedure ASTM D 1792, except ¼ dilution of FREEDOM (Diversey Inc. Sturtevant, Wis. 53177 USA) in water was used as the test stripping solution.

Tack-Free Time Test Method

The surface coatings tack-free time is determined using the ZAPON tack tester. The tack tester was fabricated out of a 1-inch (2.54 cm) wide bent piece of aluminum sheet metal that is ¹⁄₁₆th of an inch (1.6 mm) thick. It is sized so that a 1 inch square section will rest flatly on the surface. It is weighted so that when a five gram weight is placed on the center of the aluminum strip it will stand upright. If a weight less than five grams is placed on the center of the aluminum strip it will fall over. The tack tester is placed on the surface of the film with a 500-gram weight placed on the tester. The weight is kept on the tester for five seconds then removed. If the tester falls over within five seconds the coating passes the Zapon-tack free test. The time that has elapsed from when the coating was applied is recorded as the Zapon tack free time. The conditions: 73° F. (23° C.) and 16% relative humidity.

Bench Testing:

The inventive polymer and the comparative polymer both had the composition 28 BA/62 MMA/10 MAA.

TABLE 1

Invented Polymer (neutralized with TRIS AMINO TA-40; 2-amino-2-hydroxymethyl-1,3-propanediol) based formulation, MS-1126-10W exhibited higher application gloss relative to the analogous control formulations N-24-9 based on the comparative polymer, a typical Commercial Polymer applied at typical conditions of 70° F. & 50% RH

| Polymer<br>Neutralizer<br>Formulation (20%) | Comm. Polymer<br>Ammonia<br>N-24-9 | Invented Polymer<br>TRIS AMINO TA-40<br>MS-1126-10W |
|---|---|---|
| Film Formation (50F) | 10 | 10 |
| Gloss-20-VC Tile | | |
| 1 Coat | 4 | 8 |
| 2 Coats | 12 | 18 |
| 3 Coats | 20 | 30 |
| 4 Coats | 28 | 45 |
| Gloss-60-VC Tile | | |
| 1 Coat | 22 | 32 |
| 2 Coats | 41 | 52 |
| 3 Coats | 56 | 67 |
| 4 Coats | 65 | 76 |
| Leveling-Vinyl Tile | | |
| 1-4 Coats | 10 | 10 |
| Haze-Vinyl Tile | | |
| 1-4 Coats | None | None |
| Water Resistance-4 Coats | | |
| 1 Hour | 9 | 9 |
| 1 Day | 10 | 10 |
| Detergent Resistance-4 Coats | | |
| 1 Day | 10 | 10 |
| 7 Days | 10 | 10 |

TABLE 1-continued

Invented Polymer (neutralized with TRIS AMINO TA-40; 2-amino-2-hydroxymethyl-1,3-propanediol) based formulation, MS-1126-10W exhibited higher application gloss relative to the analogous control formulations N-24-9 based on the comparative polymer, a typical Commercial Polymer applied at typical conditions of 70° F. & 50% RH

| Polymer<br>Neutralizer<br>Formulation (20%) | Comm. Polymer<br>Ammonia<br>N-24-9 | Invented Polymer<br>TRIS AMINO TA-40<br>MS-1126-10W |
|---|---|---|
| Removability-4 Coats | | |
| 7 Days | 10 | 9 |
| Slip Resistance | | |
| SCOF | 0.51 | 0.53 |
| Mark Resistance | | |
| Black Heel Mark | 6 | 6 |
| Total Marks | 5 | 5 |
| Soil Resistance | | |
| ΔE-Bench | 1.4 | 1.7 |

TABLE 2

Invented Polymer (neutralized with TRIS AMINO TA-40; 2-amino-2-hydroxymethyl-1,3-propanediol) based formulation, MS-1126-10W exhibited higher application gloss relative to the analogous control formulations N-24-9 based on a typical Commercial Polymer when applied at low temperature and humidity condition of 50° F. & 30% RH.

| Polymer<br>Neutralizer<br>Formulation (20%) | Comm. Polymer<br>Ammonia<br>N-24-9 | Invented Polymer<br>TRIS AMINO TA-40<br>MS-1126-10W |
|---|---|---|
| Gloss-20-VC Tile | | |
| 3 Coats | 24 | 36 |
| 4 Coats | 32 | 47 |
| Gloss-60-VC Tile | | |
| 3 Coats | 60 | 70 |
| 4 Coats | 67 | 78 |
| Leveling-VC Tile | | |
| 1-4 Coats | 10 | 10 |
| Haze-VC Tile | | |
| 1-4 Coats | 10 | 10 |
| Gloss-20-VC Tile | | |
| 3 Coats | 23 | 38 |
| 4 Coats | 37 | 46 |
| Gloss-60-VC Tile | | |
| 3 Coats | 61 | 71 |
| 4 Coats | 70 | 76 |
| Leveling-VC Tile | | |
| 1-4 Coats | 10 | 10 |
| Haze-VC Tile | | |
| 1-4 Coats | None | None |

Floor Test Data

TABLE 3

Invented Polymer (neutralized with TRIS AMINO TA-40; 2-amino-2-hydroxymethyl-1,3-propanediol) based formulation, MS-1126-10W exhibited higher application gloss relative to the analogous control formulations N-24-9 based on a typical Commercial Polymer when applied at low temperature and humidity, 50° F. & 30% RH.

| Polymer Neutralizer Formulation (20%) | Comm. Polymer Ammonia N-24-9 | Invented Polymer TRIS AMINO TA-40 MS-1126-10W |
|---|---|---|
| Gloss-20-VC Tile | | |
| 1 Coat | 1 | 2 |
| 2 Coats | 5 | 8 |
| 3 Coats | 12 | 19 |
| 4 Coats | 23 | 33 |
| After 4 Days | 13 | 22 |
| 5 Coats (1 Top Coat) | 29 | 36 |
| 6 Coats (2 Top Coats) | 48 | 48 |
| Gloss-60-VC Tile | | |
| 1 Coat | 12 | 17 |
| 2 Coats | 30 | 38 |
| 3 Coats | 46 | 56 |
| 4 Coats | 61 | 70 |
| After 4 Days | 49 | 61 |
| 5 Coats (1 Top Coat) | 68 | 75 |
| 6 Coats (2 Top Coats) | 80 | 79 |
| Leveling-Vinyl Tile | | |
| 1 Coat | 9 | 9 |
| 2 Coats | 8 | 9 |
| 3 Coats | 9 | 10 |
| 4 Coats | 9 | 10 |
| 5 Coats | 9 | 10 |
| 6 Coats | 9 | 10 |
| Haze-Vinyl Tile | | |
| 1-6 Coats | None | None |

Additional Test Methods
Standard Test methods for the evaluation of floor finishes developed by the Home, Institutional & Personal Care Solutions business of the Dow Chemical Company were employed where applicable.

Slip Resistance
ASTM D2047 Standard Test Method for Static Coefficient of Friction of Polish-Coated Flooring Surfaces as Measured by the James Machine.

Soil Resistance is measure by the change in the color of a coated white vinyl composition tile after exposed to standard AATAC soil. The lower the $\Delta E$ the less color changes from the reference tile sample. Measurements<+/−1.0 unites are not significant since it is within the precision of the test method.

Accelerated Wear Testing Machine (AWT) is a Dow patented robotics high throughput testing machine that can generate months of floor wear test data in days. It is capable in testing polishes and cleaner on various substrates under different maintenance conditions that replicate trends seen in the field.

The attached (AWT) charts for gloss retention and soil resistance are for a moderated maintenance system in which the floor would be maintained 3 to 4 times per week. Each maintenance cycle consist of 2 operations of soiling, abrading and scrubbing the coated test substrate with a standard All Purpose Cleaner (1 oz/gal). This is followed by one burnishing operation with a floor machine and high speed burnishing pad. Gloss and color measurements ($\Delta E$) are recorded and plotted after each cycle.

General Rating System:

| | Rating Descriptor |
|---|---|
| 10 | Excellent |
| 9 | Very Good to Excellent |
| 8 | Very Good |
| 7 | Good to Very Good |
| 6 | Good |
| 5 | Fair to Good |
| 4 | Fair |
| 3 | Fair to Poor |
| 2 | Poor |

Accelerated Wear Testing Machine Results

TABLE 4

Invented Polymer (neutralized with TRIS AMINO TA-40; 2-amino-2-hydroxymethyl-1,3-propanediol) based floor finish formulation exhibited higher gloss, before and after soiled, abraded, scrubbed and burnished relative to the analogous control formulations based on a typical Commercial Polymer

| | After Burnish Gloss (20 degree) | | | After Scrubbed Gloss (20 degree) | | |
|---|---|---|---|---|---|---|
| Maintenance Cycle | Commercial Polymer | Invented Polymer | Inv. Polymer Gloss Increase | Commercial Polymer | Invented Polymer | Inv. Polymer Gloss Increase |
| Cycle 1 | 29.3 | 39.8 | 10.5 | 19.7 | 28.3 | 8.7 |
| Cycle 2 | 30.2 | 38.3 | 8.1 | 17.3 | 26.3 | 9.0 |
| Cycle 3 | 30.6 | 37.8 | 7.1 | 16.4 | 25.1 | 8.7 |
| Cycle 4 | 30.3 | 36.0 | 5.7 | 16.3 | 24.0 | 7.7 |
| Cycle 5 | 31.0 | 35.9 | 4.9 | 16.3 | 24.0 | 7.7 |
| Cycle 6 | 30.7 | 35.0 | 4.3 | 17.4 | 24.0 | 6.6 |
| Cycle 7 | 31.4 | 34.3 | 2.9 | 18.3 | 24.5 | 6.2 |
| Cycle 8 | 29.8 | 33.9 | 4.1 | 19.1 | 24.4 | 5.3 |
| Cycle 9 | 32.4 | 34.8 | 2.4 | 20.7 | 24.1 | 3.3 |
| Cycle 10 | 32.3 | 33.9 | 1.7 | 20.9 | 24.7 | 3.8 |
| Cycle 11 | 31.2 | 33.2 | 2.0 | 18.5 | 22.6 | 4.1 |
| Cycle 12 | 29.0 | 31.3 | 2.3 | 19.4 | 21.7 | 2.3 |
| Cycle 13 | 29.0 | 30.0 | 1.0 | 16.1 | 19.7 | 3.6 |
| Cycle 14 | 26.9 | 27.4 | 0.5 | 16.3 | 19.7 | 3.4 |

Formulation Details:

TABLE 5

| Ingredients (% by weight) | Commercial Polymer Formulation N-24-9 | Invented Polymer Formulation MS-1126-10W |
|---|---|---|
| Water | 45.67 | 45.67 |
| KATHON CG/ICP (1.5%) | 0.04 | 0.04 |
| CAPSTONE FS-65 (25% active) | 0.05 | 0.05 |
| CARBITOL SOLVENT-Low Gravity | 3.30 | 3.30 |
| DOWANOL DPM | — | — |
| DOWANOL TPM | — | — |
| UCAR FILMER IBT | 2.18 | 2.18 |
| Tributoxy Ethyl Phosphate | 2.08 | 2.08 |
| Commercial Polymer | 41.72 | — |
| Invented Polymer* | — | 41.72 |
| MICHEM Dispersion 94340 (40%) | 4.95 | 4.95 |
| DEE FO ® PI-40 | 0.02 | 0.02 |
| Total | 100.00 | 100.00 |

*with 1.21% TRIS AMINO TA-40
Polymer/Wax Ratio 89/11

The invention claimed is:

1. A floor coating composition, comprising:

an acrylic polymer consisting essentially of from 5 to 11 wt % polymerized units of carboxylic acid monomer having 3 to 5 carbon atoms and 89 to 95 wt % of polymerized units of one or more $C_{1-8}$ alkyl (meth) acrylate monomers comprising 45 to 80 wt % of polymerized unites of a $C_1$-$C_2$ alkyl methacrylate and 15 to 40 wt % polymerized units of a $C_4$-$C_8$ alkyl acrylate; said polymer neutralized to a pH of 7 to 8 with 1 of 8 wt % of an amino alcohol having from 2 to 4 primary hydroxyl groups, one primary amino group, and 3 to 12 carbon atoms; and from 0.5 to 10 wt %, on a solids basis, of waxes; wherein the floor coating composition is removable.

2. A method for forming a removable floor coating comprising applying the floor coating composition of claim 1 to a substrate and curing.

* * * * *